United States Patent [19]
Borschel et al.

[11] Patent Number: 5,221,545
[45] Date of Patent: Jun. 22, 1993

[54] METHOD OF PROVIDING SELENIUM IN A NUTRITIONAL PRODUCT

[75] Inventors: Marlene W. Borschel, Worthington; Helen R. Churella; Benita C. Yao, both of Columbus; Bogdan K. Kedzierski, Upper Arlington, all of Ohio

[73] Assignee: Abbott Laboratories, Abbott Park, Ill.

[21] Appl. No.: 848,639

[22] Filed: Mar. 9, 1992

[51] Int. Cl.$^5$ .............................. A23L 1/304
[52] U.S. Cl. ........................... 426/74; 426/806
[58] Field of Search ..................... 426/74, 806

[56] References Cited

U.S. PATENT DOCUMENTS

| | | | |
|---|---|---|---|
| 4,454,162 | 6/1984 | Schanze | 426/807 |
| 4,737,364 | 4/1988 | Kalogris | 426/804 |
| 4,871,550 | 10/1989 | Millman | 426/74 |
| 4,915,962 | 4/1990 | Howard | 426/74 |
| 4,990,344 | 2/1991 | Euber | 426/801 |
| 5,013,569 | 5/1991 | Rubin | 426/801 |
| 5,030,657 | 7/1991 | Burtle | 426/805 |
| 5,079,018 | 1/1992 | Ecanow | 426/385 |
| 5,085,883 | 2/1992 | Garleb | 426/573 |
| 5,104,676 | 4/1992 | Mahmoud | 426/482 |

OTHER PUBLICATIONS

"Possible Stability Problem with Selenium Premixes", Groce, et al., *Journal of Animal Science,* 33, 1149 (1971).
"The Stability of Inorganic Selenium in Premixes", Olson, et al. *Poultry Science,* 53, 403 (1973).
"Selenium Stability in TPN Solutions", Shils, et al. *The American Journal of Clinical Nurtrition,* 35, 829 (1982).
"The Importance of Selenium in Total Parenteral Nutrition", Levander, *Bulletin New York Academy of Medicine,* 50, 144 (1984).
"Comparative Effect of Selenate and Selenite on Serum Selenium Concentration and Glutathione Peroxidase Activity in Selenium—Depleted Rats" Korpela, *Annals of Nutrition & Metabolism,* 32, 347 (1988).
Postaire, et al., *International Journal of Pharmaceuticals,* 55, 99 (1989).
"Chemical Stability of Selenious Acid in Total Parenteral Nutrition Solutions Containing Ascorbic Acid", Ganther, et al., *Journal of Parenteral and Enteral Nutrition,* 13, 185 (1989).

*Primary Examiner*—Carolyn Paden
*Attorney, Agent, or Firm*—Lonnie R. Drayer; Donald O. Nickey

[57] ABSTRACT

Selenium is provided in a nutritional product by incorporating selenate into a premix with an zinc and/or copper (II) salt which is water soluble and then combining the premix with a source of nutrition to form a nutritional product.

10 Claims, No Drawings

METHOD OF PROVIDING SELENIUM IN A NUTRITIONAL PRODUCT

FIELD OF THE INVENTION

The present invention relates to a method of providing selenium, in the form of selenate, in a nutritional product, and to nutritional products which contain selenate.

BACKGROUND OF THE INVENTION

The element selenium (Se) occurs in four common oxidation states. Two of these oxidation states, selenite, which is Se (IV), and selenate which is Se (VI), are believed to be acceptable for use in a nutritional product from a biochemical and medical perspective. Elemental selenium, Se (O), is not bioavailable as a source of selenium. Selenite is readily reduced to selenide, with is Se (II), and elemental selenium, be relatively mild reducing agents such as glucose, phosphorus acid, and iodide. In contrast, selenate is more difficult to reduce than selenite and thus, is less likely to form free selenium or selenides, including hydrogen selenide. This stability of selenate makes a selenate salt the preferred chemical form for the addition of selenium to a nutritional product.

However, selenite has been employed in nutritional products for the purpose of adding selenium to nutritional products. The incorporation of sodium selenite in a premixed combination of ingredients for use in a nutritional product has created several problems. These problems were manifested by the incomplete solubility of the premixed combination of ingredients and by a repulsive odor that emanated from the premixed combination of ingredients. The source of these problems stemmed from the interactions of sodium selenite with ferrous sulfate and cupric sulfate. Either or both of these salts, when ground together with sodium selenite, caused the reduction of sodium selenite to an insoluble reddish material, which is believed to be metallic selenium. A repugnant odor emitted from this mixture is believed to be hydrogen selenide which was formed as a byproduct of the same redox reactions. The problems may be significantly reduced by using special mixing techniques and/or the use of selenate in a premixed combination of ingredients for use in a nutritional product.

PRIOR ART

Numerous reports in the literature have examined the bioavailability of sodium selenite compared to other forms of selenium (sodium selenate, selenomethionine, selenocysteine). Groce et al, Journal of Animal Science, 33, 1149 (1971) and Olson et al, Poultry Science, 53, 403 (1973) comment upon the instability of selenite salts in premixed combinations of ingredients for nutritional products when premixes contain sugars or other organic substances.

Shils et al, 22nd Annual Meeting of the American Society for Clinical Nutrition, 1982, abstract published in The American Journal of Clinical Nutrition, 35, 829 (1982) teach that selenium added to total parenteral nutrition (hereinafter referred to as TPN), solutions as sodium selenite is reduced to an elemental form which is insoluble and biologically unavailable. Interactions with ascorbic acid and mineral components, such as copper (II) of multiple mineral and vitamin solutions added to TPN were shown to be responsible for selenium losses.

Levander, Bulletin New York Academy of Medicine, 50, 144 (1984) compares properties of various forms of selenium (sodium selenite, sodium selenate, selenomethionine) suitable for supplementation of TPN solutions. This publication teaches that the main disadvantage of selenite is a high chemical reactivity that renders selenite unstable in certain formulations. High concentrations of ascorbic acid reduce selenite to elemental selenium, which is almost totally unavailable as a nutritional source. This reaction can be accelerated by cupric ion, and has been shown to be of practical significance when selenite solutions are mixed with a multiple-vitamin solution in the presence of copper (II). Sodium selenate appears to have most of the best features of both selenite and selenomethionine because it is a nutritionally available source of selenium and has good chemical stability. This publication teaches that the main drawbacks of selenate are that this form of selenium has not been extensively studied and its metabolic behavior is not well characterized when given intravenously.

Korpela, Annals of Nutrition and Metabolism, 32, 347 (1988) teaches that the effects of selenite and selenate on concentrations of selenium in serum of selenium-depleted animals were similar for both forms in his studies. Consequently, he recommends that selenate be regarded as an appropriate form for selenium supplementation because it is more stable and less toxic than selenite.

Postaire et al., International Journal of Pharmaceutics, 55, 99 (1989) teaches that ascorbic acid, particularly in the presence of copper (II) ions reduced selenite to elemental selenium. These reactions were held responsible for the complete loss of selenite in TPN solutions. Reduction of selenite was also observed to occur in dextrose solutions, and results indicated a detectable change in selenium recovery when a solution contains electrolytes as phosphate salts.

Ganther et al, Journal of Parenteral and Enteral Nutrition, 13, 185 (1989) relates an investigation of the reduction of selenite to elemental selenium by ascorbic acid with regard to the stability of selenite in TPN solutions. While complete reduction of selenite occurred in ascorbic acid solutions, there was little or no reduction of selenium in complete TPN formulas. This publication teaches that the amino acid component of the TPN formula prevented the reduction of selenite in buffered solutions having a pH of 5 or greater. Selenate is not reduced by ascorbic acid under any of the above described experimental conditions.

DETAILED DESCRIPTION OF THE INVENTION

A first example of a premix used in the practice of the present invention is set forth in Table 1, which is followed by a description of how to manufacture the premix.

TABLE 1

COMPOSITION OF NUTRITIONAL ULTRA TRACE/TRACE MINERAL PREMIX

| Ingredient | Amount for 1000 Kg |
| --- | --- |
| Ferrous Sulfate, Dried, USP | 197.0 Kg |
| Zinc Sulfate, Monohydrate, USP | 204.6 Kg |
| Cupric Sulfate, USP | 29.2 Kg |
| Manganese Sulfate, Monohydrate, USP | 54.12 Kg |
| Sodium Selenate | 0.610 Kg |
| Chromic Chloride Hexahydrate | 1.434 Kg |

TABLE 1-continued
COMPOSITION OF NUTRITIONAL ULTRA TRACE/TRACE MINERAL PREMIX

| Ingredient | Amount for 1000 Kg |
| --- | --- |
| Sodium Molybdate Dihydrate | 1.475 Kg |
| Citric Acid, USP, Anhydrous | 61.72 Kg |
| Sucrose or Maltodextrin (diluent) | 449.65 Kg |

Manufacturing Procedure

Dry blend zinc sulfate, chromic chloride, sodium selenate and sodium molybdate with the diluent. Mill the premix through a No. 4 band using a suitable mill, such as a Fitzmill, at high speed. Discharge the premix into a V-Blender and blend for 15 minutes. Discharge the premix from the V-Blender through a No. 0 band using a suitable mill, such as a Fitzmill, at high speed, impact forward into a polyethylene lined container (Blend A). Dry blend ferrous sulfate, cupric sulfate, manganese sulfate and citric acid using a blender for 15 minutes. Discharge materials in blender through a No. 0 band using a suitable mill, such as a Fitzmill, at high speed and impact forward into a polyethylene lined container (Blend B). Dry mix Blends A and B for one hour in V-Blender. Discharge premix into a fiber drum.

A second example of a premix used in the practice of the present invention is set forth in Table 2, which is followed by a description of how to manufacture the premix.

TABLE 2
COMPOSITION OF NUTRITIONAL ULTRA TRACE/TRACE MINERAL PREMIX

| Ingredient | Amount for 1000 Kg |
| --- | --- |
| Taurine (food supplement) | 305.600 Kg |
| Sodium Selenate | 217.200 Kg |
| Zinc Sulfate, USP, Monohydrate | 91.970 Kg |
| Biotin, USP | 363.000 g |
| Niacinamide, USP | 66.500 Kg |
| Calcium Pantothenate, USP | 36.000 Kg |
| Thiamine Hydrochloride, USP | 10.180 Kg |
| Pyridoxine Hydrochloride, USP | 4.130 Kg |
| Riboflavin, USP | 4.497 Kg |
| Folic Acid, USP | 1.265 Kg |
| Ferrous Sulfate, Dried, USP | 35.030 Kg |
| Cupric Sulfate, USP | 18.940 Kg |
| Inositol, FCC | 222.000 Kg |
| Manganese Sulfate, USP Monohydrate | 862.700 g |
| Cyanocobalamin powder in starch 1000 mcg/gm (vitamin B12) | 30.240 Kg |
| Dextrose, USP, Anhydrous | 172.205 Kg |

Manufacturing Procedure

Dry blend approximately one-half of the taurine with sodium selenate, zinc sulfate, biotin, and manganese sulfate and approximately one-half of the dextrose. Mill through a No. 4 band using a suitable mill, such as a Fitzmill at high speed, discharge the blend into a V-Blender. Mill the remainder of the taurine through a No. 4 band using a suitable mill, such as a Fitzmill at high speed and impact forward to a V-Blender and blend for 30 minutes. Discharge blender contents through an 0 band using a suitable mill, such as a Fitzmill at high speed, impact forward into a polyethylene lined container (Blend A). Mill the niacinamide, calcium pantothenate, thiamine hydrochloride, pyridoxine hydrochloride, riboflavin, folic acid, ferrous sulfate, cupric sulfate, inositol, Vitamin B12 and remainder of the dextrose through a No. 4 band using a suitable mill, such as a Fitzmill at high speed and impact forward into a V-Blender and blend for 30 minutes. Discharge blender contents through a 0 band using Fitzmill at high speed and impact forward into a polyethylene lined container (Blend B). Speed sift the milled material (Blend A and Blend B) through a 16 mesh screen into a V-Blender and blend for 60 minutes. Package the premix.

Selenite has been found to be equally as bioavailable as selenate. However, selenite is known to be more readily reduced than selenate to elemental selenium which is not bioavailable. In an attempt to determine the preferred form of selenium for fortification of nutritional products, the absorption and retention of selenite and selenate from a vitamin/mineral premix and from two processed nutritional products as studied using a rat model.

A study was designed to assess independently the potential reactivity of selenite and selenate from a mineral/vitamin premix, and formulas prepared with the premix when freshly made and over 3 to 9 months of shelf life in rats. In the presence of reducing substances in the premix both selenite and selenate theoretically could be reduced to elemental Se. Normally, both selenite and selenate are well absorbed. Thus, short-term retention of $^{75}$Se by the animals is likely reflective of the selenite/selenate ingested that is present in a bioavailable form.

Selenate/selenite, zinc and copper were incorporated into a vitamin/mineral premix similar to that set forth in Table 2 in the following quantities:

| Component | Per 1 g Premix |
| --- | --- |
| Selenium, mcg | 71–111 |
| Zinc, mg | 33–41 |
| Copper, mg | 4.4–5.2 |

Sufficient amounts of premix were added to the infant nutritional products Similac ® with Iron and Isomil ® to provide approximately 12–30 mcg Se/L of finished product (added plus inherent). Similac ® with Iron and Isomil ® are commercially available nutritional products for infants and both are manufactured by Ross Laboratories, a Division of Abbott Laboratories, Columbus, Ohio.

The results of the study showed that the apparent absorption of selenate as estimated by whole-body retention 1 day post-dose was significantly greater (4% to 15%) than that of selenite from both the premix and products throughout the study. Whole body retention at 10 days post-dose of both selenite and selenate in rats fed all diets decreased significantly during the first 3 months of shelf-life. Whole-body retention of selenite and selenate from formula diets was also examined at 9 months of storage and did not appear to decrease further from that at 3 months. Overall, whole-body retention 10 days post-dose of rats fed selenate ranged from 51% to 61% for premix and formula diets over shelf-life compared to retentions of 42% to 49% for selenite. These data confirmed that selenate remained more bioavailable to rats when incorporated into premix and processed formulas. Due to the inability to incorporate the radioisotope ($^{75}$Se) during commercial manufacture of the premix, it is believed that the effects observed for this portion of the study underestimated those likely occurring during commercial manufacture. The results suggest that some reaction(s) is taking place, particularly in nutritional products during processing and early storage, which reduces the apparent absorption and retention of selenite and selenate by rats. This was a surprising finding for selenate because it has been assumed to be relatively nonreactive compared to selenite. Although some reaction(s) involving both selenite and selenate appear to be occurring during premix and product manufacture and over shelf-life, the results of the study suggest that selenate is the preferred form in which to provide Se, a mineral required by animals and humans.

Improved stability and reduced reactivity in a nutritional premix similar to that set forth in Table 2 was confirmed via testing of two pediatric premixes by different analytical methods. Total Se was measured by the dissolution in 2% HCl (HCl method) whereas soluble Se, or that believed to be soluble and bioavailable after incorporation into the vitamin/mineral premix, was assessed by the dissolution in citric acid solution (citric acid method) method. Estimations of the amount of bioavailable Se present in each freshly made premix prepared with both selenite and selenate is shown in Table 3.

TABLE 3

| | HCl SOLUBLE | CITRIC ACID SOLUBLE | PERCENT BIOAVAILABLE* |
|---|---|---|---|
| Premix | | | |
| with Selenite | 52.9 mcg/g | 44.2 mcg/g | 83.5% |
| with Selenate | 62.2 mcg/g | 59.8 mcg/g | 96.1% |
| Premix | | | |
| with Selenite | 89.8 mcg/g | 70.3 mcg/g | 78.2% |
| with Selenate | 89.3 mcg/g | 95.6 mcg/g | 107% |

*Amount determined by citric acid method divided by amount determined by HCl method.

The results confirmed that when selenate was added to a premix similar to the set forth in Table 2, a significantly greater percent of the added selenium was bioavailable after manufacture of the premix. Less than 5% of the selenate appeared to have been rendered as insoluble Se compared to 16% to 22% of the selenite.

In the practice of the present invention a premix of selenate and iron (II) and/or copper (II) salts which are water soluble is combined with a source of proteins and/or carbohydrates and/or fats to form a nutritional product. It is understood that this invention may be practiced by making a nutritional product which contains, for example, only carbohydrates but no proteins or fats. Such a product may be consumed in such a state or possibly could be supplemented with additional nutrients at the time of consumption. The most preferred iron (II) salt is iron sulfate. The most preferred copper (II) salt is copper sulfate. In a most preferred embodiment the premix contains selenate, iron sulfate, copper sulfate and zinc sulfate.

While certain representative embodiments and details have been set forth for the purpose of illustrating the invention, it will be apparent to those skilled in this art that various changes and modifications may be made therein without departing from the spirit or scope of the invention.

We claim:

1. A method of providing selenium in a nutritional product comprising the steps of:
   (a) providing a premix comprising selenate, a water soluble copper salt, and a water soluble zinc salt, wherein each gram of the premix contains at least 71 mcg of selenium, 33 mg of zinc and 4.4 mg of copper, characterized by said selenate, copper salt and zinc salt all having been in a powdered form while said selenate, copper salt and zinc salt were mixed together; and
   (b) thereafter combining said premix with at least one source of nutrition selected from the group consisting of proteins, fats and carbohydrates to form a nutritional product.

2. A method of providing selenium in a nutritional product according to claim 1 wherein zinc sulfate is combined with selenate to make a premix.

3. A method of providing selenium in a nutritional product according to claim 1 wherein copper sulfate is combined with selenate to make a premix.

4. A method of providing selenium in a nutritional product according to claim 1 wherein zinc sulfate and copper sulfate are combined with selenate to make a premix.

5. A method of providing selenium in a nutritional product according to claim 4 wherein ferrous sulfate is incorporated into the premix, with all of the ingredients of the premix being combined while in a powdered form.

6. A nutritional product containing selenium in the form of selenate, said nutritional product being manufactured by a process comprising the steps of:
   (a) providing a premix comprising selenate, at least one copper salt that is water soluble and at least one zinc salt that is water soluble, wherein each gram of the premix contains at least 71 mcg of selenium, 33 mg of zinc and 4.4 mg of copper, characterized by the selenate, copper salt and zinc salt all having been in a powdered form while said selenate, copper salt and zinc salt were mixed together;
   (b) thereafter combining said premix with at least one source of nutrition selected from the group consisting of proteins, fats and carbohydrates to form a nutritional product.

7. A nutritional product containing selenium in the form of selenate manufactured by the process set forth in claim 6 wherein zinc sulfate is combined with selenate to make a premix.

8. A nutritional product containing selenium in the form of selenate manufactured by the process set forth in claim 6 wherein copper sulfate is combined with selenate to make a premix.

9. A nutritional product containing selenium in the form of selenate manufactured by the process set forth in claim 6 wherein zinc sulfate and copper sulfate are combined with selenate to make a premix.

10. A nutritional product containing selenium in the form of selenate manufactured by the process set forth in claim 9 wherein ferrous sulfate is incorporated into the premix, with all of the ingredients of the premix being combined while in powdered form.

* * * * *

UNITED STATES PATENT AND TRADEMARK OFFICE
CERTIFICATE OF CORRECTION

PATENT NO. : 5,221,545
DATED : June 22, 1993
INVENTOR(S) : Marlene W. Borschel, Helen R. Churella, Benita C. Yao, Bogdan K. Kedzierski It is certified that error appears in the above-indentified patent and that said Letters Patent is hereby corrected as shown below:

At column 1, line 19, "with" should be --which--.
At column 1, line 20, "be" should be --by--.
At column 4, line 15, "as" should be --was--

Signed and Sealed this

Twenty-ninth Day of March, 1994

Attest:

BRUCE LEHMAN

*Attesting Officer*  *Commissioner of Patents and Trademarks*